United States Patent [19]
Hung
[11] Patent Number: 4,765,593
[45] Date of Patent: Aug. 23, 1988

[54] HYDRAULIC JACK HAVING A REMOVABLE HYDRAULIC CARTRIDGE

[76] Inventor: Michael Hung, 11th Fl., 624 Ming Chuan E. Rd., Taipei, Taiwan

[21] Appl. No.: 91,956

[22] Filed: Sep. 1, 1987

[51] Int. Cl.[4] .................................... B60P 1/48
[52] U.S. Cl. ........................................ 254/8 B
[58] Field of Search ............... 254/8 B, 8 R, 2 B, 2 R, 254/93 H, 93 R, 124, DIG. 1

[56] References Cited

U.S. PATENT DOCUMENTS 1,350,970 8/1920 Hutchison et al. ........... 254/DIG. 1
2,643,779 6/1953 Hamlin ................................ 254/8 R
3,521,860 7/1970 Zehrung et al. .................... 254/8 R
4,596,378 1/1986 Liang et al. ......................... 254/8 B

FOREIGN PATENT DOCUMENTS 1248261 9/1971 United Kingdom ................ 254/8 B

*Primary Examiner*—Robert C. Watson
*Attorney, Agent, or Firm*—Wenderoth, Lind & Ponack

[57] ABSTRACT

A strengthened and improved structure for a hydraulic jack, a significant feature of which is that on the inner side of each side board of the frame body of the hydraulic jack, there is provided a drive bracket and a blocking piece for supporting and retaining a hydraulic cartridge. The frame body of the hydraulic jack is strengthened and constructed by welding. Also, the hydraulic cartridge can be quickly and easily dismounted from or mounted in to the frame body for repair or replacement.

6 Claims, 2 Drawing Sheets

HYDRAULIC JACK HAVING A REMOVABLE HYDRAULIC CARTRIDGE

BACKGROUND OF THE INVENTION (a) Field of the Invention

This invention relates to a strengthened and improved structure for a hydraulic jack, which is constructed mainly by providing a drive bracket and a blocking piece at the proper location in the inner side at each side board of the frame body of the hydraulic jack for mounting of the hydraulic cartridge via its semicircular cylindrical base to the frame body of the hydraulic jack. A quick dismounting/mounting means is provided inbetween the hydraulic cartridge and the frame body of the hydraulic jack, therefore, the hydraulic cartridge can be quickly dismounted/mounted when repair is required, also the frame body is strengthened by welding process, which prevents it from eccentric loading deformation, whereby, a sturdy and safe hydraulic jack is constructed.

(b) Description of the Prior Art

In the traditional hydraulic jack, the hydraulic cartridge is mounted with its base on a through-axle. This through-axle is then mounted on a frame body which consists of two side plates and is tightened together along with the hydraulic cartridge by bolts and nuts. From a structural point of view, the traditional hydraulic jack contains too many jointing points, fasteners, bolts, nuts, and the like. Therefore, when it is loaded, the load weight will be distributed in proportion to each of the above jointing points and component parts, and in a case of the saddle of the hydraulic jack being eccentrically loaded, even if the load weight is within the load specifications of such a hydraulic jack, the induced moment and shearing force will be absorbed completely by the above jointing points and component parts to make them loosen. Even if the condition is less serious, the above-named component parts will become deformed thus affecting the subsequent dismounting or adjustment of the works. But if the condition is quite serious, the whole hydraulic jack collapse, thus, endangering the user or causing damage to the load. In order to eliminate the above shortcomings while providing a strengthened, sturdy, and quick dismounting/mounting hydraulic jack, the first thing one has to do is to reduce the jointing points of the relevant component parts which constitute the frame body of the hydraulic jack. Thus, the most desirable design is to construct the frame body of the hydraulic jack into a whole and integrated body, i.e. all jointing points are replaced by welding process to enhance the load bearing structural strength of the frame body. However, in a traditional hydraulic jack, no matter whether its frame body is jointed by bolting or welding the relevant parts together, the hydraulic cartridge is always mounted on the frame body with its base via a supporting through-axle by screw nuts. Therefore, if it is necessary that repair should be made to the hydraulic cartridge, then the frame body of the hydraulic service jack must be first disassembled; thereafter, the nuts on the through-axle must be removed, then the hydraulic cartridge can be finally dismounted. From the above description, it can be seen that the dismounting procedure for the hydraulic cartridge from the frame body of the conventional hydraulic jack is complex in nature and this constitutes another shortcoming of the traditional hydraulic jack.

In summary, the traditional hydraulic jack has the following shortcomings:

i. The frame body of a traditional jack is joined by a plurality of bolts and nuts. If repair is required owing to parts failure of the hydraulic cartridge such as failure of the oil seal, O-ring, or hydraulic cylinder, or structural component parts damage, such as link assemblies, or linkage rods and the like of the hydraulic jack, it takes time and requires a complex procedure for accomplishing dismounting/mounting work when the bad parts are to be replaced by new ones.

ii. There exist too many jointing points in a traditional hydraulic jack. They contribute adversely to its load bearing structural strength, whereby, it can be easily damaged by shearing force as well as creating safety problems. If all of these jointing points of the frame body are replaced by welding, although the structural strength of the frame body in increased, when the ram plunger or any other parts in the hydraulic cartridge break and require replacement, the repair work can not be easily done because the hydraulic cartridge can not be easily dismounted from the frame body and vice versa.

iii. In the manufacturing process of the traditional hydraulic jack, given that the assembling work of its two side boards into a frame body is both time and labor consuming, and consequently the unit production cost is still not considerably reduced. These all contribute adversely to its market competition ability.

SUMMARY OF THE INVENTION

The main object of the present invention is to provide a strengthened and improved structure for a hydraulic jack. One feature is that the frame body of the hydraulic jack is constructed by welding the relevant component parts together, so that the hydraulic jack possesses a strengthened and sturdy frame body, whereby shearing force damage to its components owing to eccentric loading or improper operating of the hydraulic jack can be avoided, and the user's safety is increased thereby. The next object of the present invention is to provide a strengthened and improved structure for a hydraulic jack, in which, the hydraulic cartridge can be easily dismounted from or mounted into the frame body from the bottom side of the frame body without any of the inconvenient and cumbersome dismantling of the bolts and screw nuts which tighten the relevant parts of the frame body together as in the traditional hydraulic jack.

The next object of the present invention is to provide a strengthened and improved structure for a hydraulic jack, of which the hydraulic cartridge can be directly and quickly dismounted from the frame body for repair when it is in trouble, and its commitment time is increased therefrom.

A further object of the present invention is to provide a strengthened and improved structure for a hydraulic jack, of which the structure is simplified, and the hydraulic cartridge can be quickly dismounted from and mounted to the frame body of the hydraulic jack, because both of the hydraulic cartridge and the frame body are constructed as discrete subassemblies and they are joined together to form a hydraulic jack. Therefore, the cumbersome manufacturing process of the conventional hydraulic jack can be considerably simplified for saving both time and labor, the consequence of which is the reduction of unit production cost and the increase of market competition ability thereof.

DESCRIPTION OF THE PREFERRED EMBODIMENT

Figure 1:
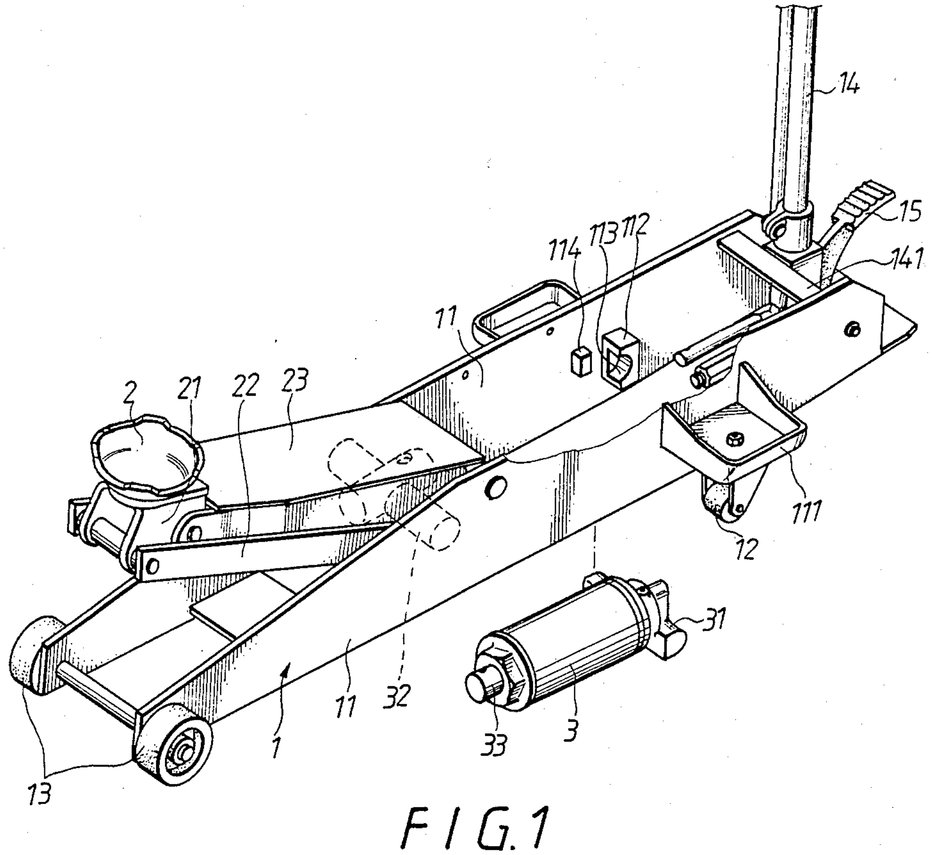
FIG. 1 is the exposed perspective view of a first embodiment of the present invention.
Figure 2:
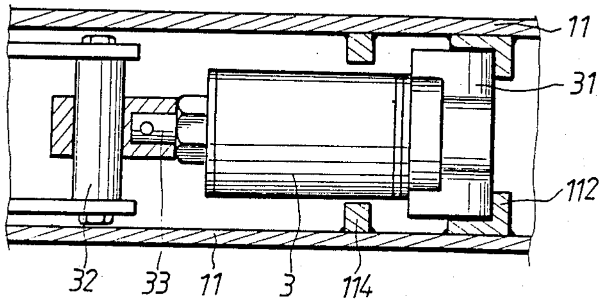
FIG. 2 is the top side view of the embodiment of FIG. 1 of the present invention.

As shown in FIGS. 1 and 2 the present invention is embodied in a trolley type hydraulic jack structure, comprising mainly a frame body 1, a saddle 2 and a hydraulic cartridge 3, of which the Frame body 1—comprises mainly two vertical side boards 11 and a horizontal separation base board, these boards are welded together to form an integral frame body. The front end of the frame body 1 is provided with a front wheel axle, on which are mounted two front wheels 13. Also, at the rear portion of the frame body 1 on the underside thereof are two outwardly extended left and right side supporting brackets 111. These brackets 111 are provided with respective rear casters 12. Such wheels and casters are utilized to provide mobility for this hydraulic jack. At the rear end of the frame body 1 a handle fork axle 141 is provided. And, on this axle 141 a handle assembly 14 and a pedal assembly 15 are provided.

Furthermore, on the inner sides of the two side boards 11 at proper locations near the rear portion of the frame body 1, the side boards 11 are provided with respective drive bracket 112, and on each drive bracket 112 a semicircular groove 113 is provided. The semicircular grooves 113 are provided in order that a hydraulic cartridge 3 can be horizontally placed inside the frame body 1 thereon.

Further, the drive brackets 112 are orientated with their semicircular grooves 113 facing toward the front side of the jack with a proper angle. Also, on the inner sides of the side boards 11, at proper locations in front of the semicircular grooves 113 of the drive brackets 112, respective blocking pieces 114 are provided. Blocking pieces 114 are utilized to stop the forward movement of the base of the hydraulic cartridge 3 to prevent it from accidentally dropping out as shown in FIG. 2. This simplified structure allows the hydraulic cartridge 3 to be easily dismounted from or mounted into the frame body 1 without the necessity of removing bolts and screw nuts which tighten the side boards of the frame body 1 and the screw nuts which tighten the through-axle for the base of the hydraulic cartridge 3 as in a traditional hydraulic jack. Moreover, because the frame body 1 is joined together by welding, it is strengthened thereby. Thus, shearing force damage to the component parts of the hydraulic jack owing to improper use is avoided.

Saddle 2—is provided in the space inbetween the two vertical side boards 11 at the front portion of the frame body 1, and the bottom side of the saddle 2 is provided with a saddle supporting rack 21. Through the linkage action of lifting arms 23 and connecting rods 22, the saddle supporting rack 21 is joined indirectly to the two vertical side boards 11 of the frame body 1 via a tail end axle, so that in this manner, the saddle 2 can be driven to move upwardly or downwardly for lifting things by the pushing force from the ram plunger 33 of the hydraulic cartridge 3.

Hydraulic cartridge 3—has structure similar to a traditional one, therefore, its details are omitted. The hydraulic cartridge is joined to the axle rod 32 located under the lifting arms 23, as shown in FIGS. 1 and 2, for driving the lifting arms 23 and connecting rods 22 to move upwardly or downwardly. The bottom end of the hydraulic cartridge 3 is provided with a semicircular cylindrical base 31 which extends toward both its left and right side, so that in this manner, it can be fitted into the semicircular grooves 113 of the drive brackets 112. Also, its width is about the same as the distance between the two side boards 11 of the frame body 1.

In addition to the present invention being applied to the above trolley type hydraulic jack, it can also be applied to other types of hydraulic jack.

Figure 3:
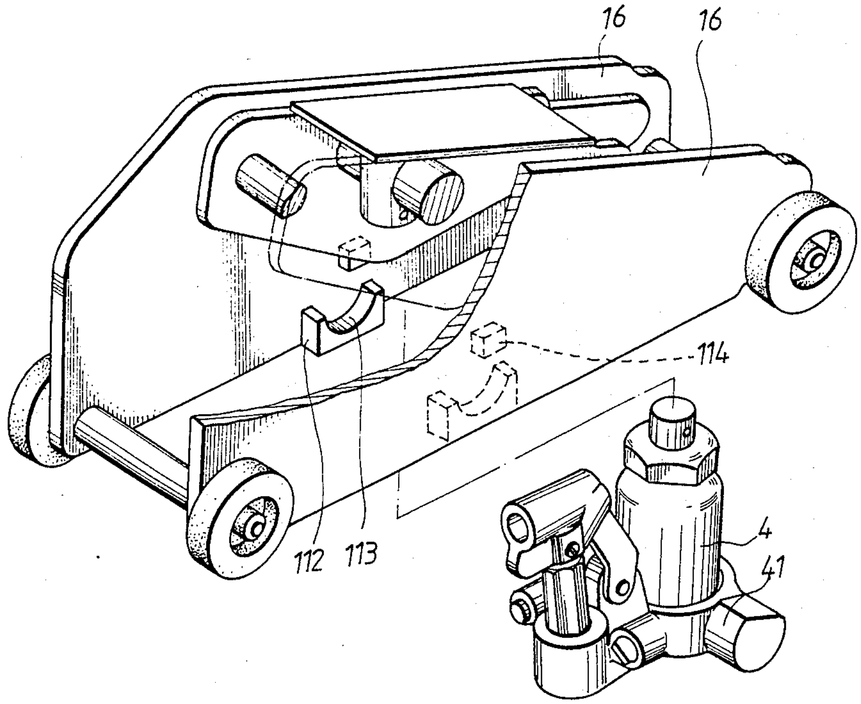
FIG. 3 is the exposed perspective view of a second embodiment of the present invention.
Figure 4:
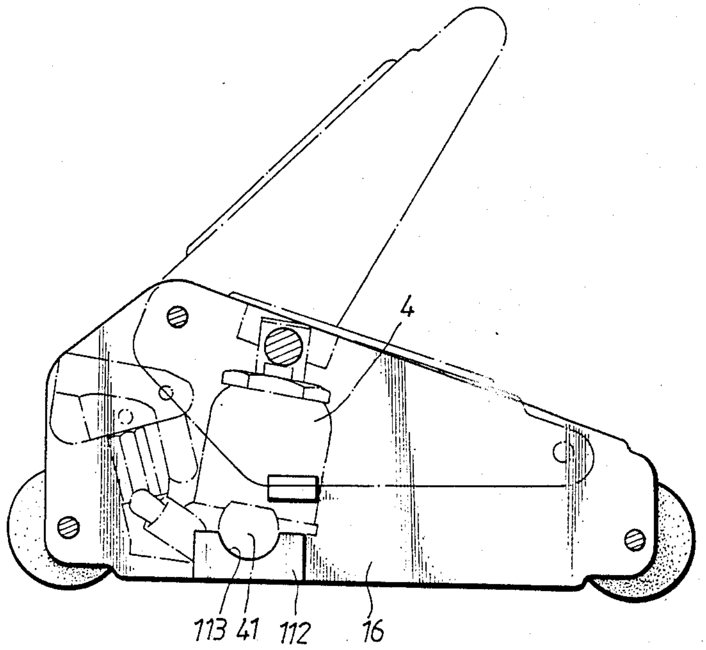
FIG. 4 is the side view of the embodiment of FIG. 3 of the present invention.

FIGS. 3 and 4 illustrate another embodiment of the present invention, which is a portable 4-wheel hydraulic jack with the hydraulic cartridge 4 mounted in vertical position, on the inner sides of the two vertical side boards 16. At proper locations they are also provided with respective drive brackets 112 and their semicircular grooves 113 are orientated in a substantially upward direction depending on the positioning of the hydraulic cartridge. When the hydraulic cartridge 4 is mounted in place from the rear side of the frame body 16, the semicircular cylindrical base 41 of the hydraulic cartridge 4 will be seated in the semicircular grooves 113 of the drive bracket 112, while the blocking pieces 114 located on the top sides of the drive brackets 112 are utilized to prevent the hydraulic cartridge 4 from dropping out. It should be emphasized that in the present invention, once the frame body 16, the hydraulic cartridge 4, and the lifting arms are assembled together, even if the jack is subjected to violent vibration during transportation, the hydraulic cartridge 4 only vibrates with its base 41 between the drive brackets 112 and the blocking pieces 114 without coming off. Also, when the lifting arms are lifting a heavy thing, the gravitational force will push the hydraulic cartridge 4 downward to make it seated firmly in the semicircular grooves 113 of the drive brackets 112 with its base 41 without any slip. This is a safety measure, which has been tested and proved by the applicant.

From the above detailed description of two preferred embodiments of the present invention, it can be seen that the relevant component parts for the frame body 1 of the present invention are fabricated first, then, they are welded together to form an integral and sturdy frame body 1. Finally, the hydraulic cartridge 3 is mounted on the frame body 1. A hydraulic jack constructed in this manner not only possesses a strengthened and sturdy frame body 1, but also the hydraulic cartridge 3 can be quickly and easily dismounted from the frame body 1 for repair, or quickly and easily mounted to the frame body 1 after the repair work is done. Also, especially during the manufacturing process of this hydraulic jack, given that the hydraulic cartridge 3 can be quickly mounted to the frame body 1, the production process can be considerably simplified for saving both time and labor, i.e. production cost.

I claim:

1. A hydraulic jack comprising:

a frame body including a pair of spaced opposed vertical side boards, said frame body having a front and rear end;

a pair of spaced opposed side brackets located substantially at the rear end of said frame body and attached to respective ones of said pair of spaced opposed vertical side boards, each said side bracket having a groove, said groves being substantially aligned for receiving and positioning a base of a horizontally oriented hydraulic cartridge;

a pair of spaced opposed blocking pieces located forwardly of said side brackets and attached to respective ones of said pair of vertical side boards, each said blocking piece being located adjacent and spaced from one of said grooves for releasably captively retaining a base of a horizontally oriented hydraulic cartridge;

a horizontally oriented hydraulic cartridge, said cartridge having a substantially horizontal actuatable ram and a base, said base being releasably captively retained by said grooves and said spaced opposed blocking pieces; and lifting arm means for lifting objects, said lifting arm means being attached to said frame body forwardly of said side brackets and being actuated by said substantially horizontal ram of said hydraulic cartridge.

2. A hydraulic jack as in claim 1, wherein each said groove is semicircular, and said base of said hydraulic cartridge is a semicircular cylinder.

3. A hydraulic jack as in claim 1, said frame body further comprising a plurality of horizontal separating base boards between and integrally welded to said pair of spaced opposed vertical side boards, wherein said frame body is rigid and integral.

4. A hydraulic jack comprising:

a frame body including a pair of spaced opposed vertical side boards, said frame body having a front and rear end;

a pair of spaced opposed side brackets located substantially at the rear end of said frame body and attached to respective ones of said pair of spaced opposed vertical side boards, each said side bracket having a groove, said grooves being substantially aligned for receiving and positioning a base of a vertically oriented hydraulic cartridge;

a pair of spaced opposed blocking pieces located forwardly of said side brackets and attached to respective ones of said pair of vertical side boards, each said blocking piece being located adjacent and spaced from one of said grooves for releasably captively retaining a base of a vertically oriented hydraulic cartridge;

a vertically oriented hydraulic cartridge, said cartridge having a substantially vertical actuatable ram and a base, said base being releasably captively retained by said grooves and said spaced opposed blocking pieces; and lifting arm means for lifting objects, said lifting arm means being attached to said frame body forwardly of said side brackets and being actuated by said substantially vertical ram of said hydraulic cartridge.

5. A hydraulic jack as in claim 1, wherein each said groove is semicircular, and said base of said hydraulic cartridge is a semicircular cylinder.

6. A hydraulic jack as in claim 1, said frame body further comprising a plurality of horizontal separating base boards between and integrally welded to said pair of spaced opposed vertical side boards, wherein said frame body is rigid and integral.

* * * * *